(12) United States Patent
Elting et al.

(10) Patent No.: US 9,476,451 B2
(45) Date of Patent: Oct. 25, 2016

(54) GUIDE CARRIAGE HAVING A ROLLING-BODY GUIDE SECTION WHICH ENGAGES BEHIND THE RACEWAY INSERT

(71) Applicant: Robert Bosch GmbH, Stuttgart (DE)

(72) Inventors: Martina Elting, Schweinfurt (DE); Juergen Schenk, Knetzgau (DE); Michael Korbacher, Wipfeld (DE); Stefan Dorn, Arnstein (DE); Marco Stock, Roethlein (DE); Mario Ziegler, Bergtheim (DE); Gerd Spatschek, Mellrichstadt (DE); Peter Schlegel, Bad Windsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/723,818

(22) Filed: May 28, 2015

(65) Prior Publication Data
US 2015/0345553 A1    Dec. 3, 2015

(30) Foreign Application Priority Data

May 28, 2014    (DE) .................... 10 2014 210 173

(51) Int. Cl.
| | |
|---|---|
| F16C 29/06 | (2006.01) |
| F16C 43/04 | (2006.01) |
| F16C 29/08 | (2006.01) |
| F16C 33/60 | (2006.01) |

(52) U.S. Cl.
CPC ........... F16C 29/06 (2013.01); F16C 29/0607 (2013.01); F16C 29/0645 (2013.01); F16C 29/088 (2013.01); F16C 33/60 (2013.01); F16C 43/04 (2013.01)

(58) Field of Classification Search
CPC ............ F16C 29/0602; F16C 29/0604; F16C 29/0607; F16C 29/0623; F16C 29/0645
See application file for complete search history.

(56) References Cited

U.S. PATENT DOCUMENTS

| | | | | |
|---|---|---|---|---|
| 5,059,037 A | * | 10/1991 | Albert | F16C 29/0604 384/45 |
| 5,195,391 A | * | 3/1993 | Barbat | B23Q 1/267 248/657 |
| 5,431,498 A | * | 7/1995 | Lyon | F16C 29/005 384/45 |
| 7,950,853 B2 | | 5/2011 | Mueller | |
| 2008/0138001 A1 | * | 6/2008 | Winkler | F16C 29/0604 384/15 |
| 2008/0232726 A1 | * | 9/2008 | Haub | F16C 29/001 384/44 |
| 2011/0200277 A1 | | 8/2011 | Winkler | |
| 2013/0315515 A1 | | 11/2013 | Hsu | |

FOREIGN PATENT DOCUMENTS

| | | |
|---|---|---|
| DE | 90 11 444 U1 | 11/1990 |
| DE | 10 2006 027 061 B4 | 12/2007 |
| DE | 10 2007 057 834 A1 | 6/2009 |
| EP | 0 422 419 A2 | 4/1991 |

* cited by examiner

Primary Examiner — Thomas R. Hannon
(74) Attorney, Agent, or Firm — Maginot, Moore & Beck LLP

(57) ABSTRACT

A guide carriage is configured for use with an elongate guide rail. The guide carriage has at least one row of spherical rolling bodies which are received in an associated endless circulatory channel. The circulatory channel has a load-bearing section and a return channel which are connected to one another at their ends which lie opposite one another via in each case one curved deflection channel. The load-bearing section is delimited by a carriage raceway extending in a longitudinal direction on the guide carriage and a rail raceway on the guide rail. A separate main body of metal is also provided. The carriage raceway is arranged on a separate raceway insert which bears against the main body. A separate rolling-body guide part is also provided which has a guide section extending in the longitudinal direction. The guide section engages behind the raceway insert.

29 Claims, 3 Drawing Sheets

GUIDE CARRIAGE HAVING A ROLLING-BODY GUIDE SECTION WHICH ENGAGES BEHIND THE RACEWAY INSERT

This application claims priority under 35 U.S.C. §119 to patent application number DE 10 2014 210 173.5, filed on May 28, 2014 in Germany, the disclosure of which is incorporated herein by reference in its entirety.

BACKGROUND

The disclosure relates to a guide carriage.

DE 10 2007 057 834 A1 has disclosed a guide carriage which is provided for use with an elongate guide rail. The guide carriage comprises four rows of spherical rolling bodies which are received in each case in an associated endless circulatory channel. Each circulatory channel comprises a load-bearing section and a return channel which are connected to one another at their two ends which lie opposite one another via in each case one curved deflection channel. The load-bearing section is delimited by a carriage raceway on the guide carriage and a rail raceway on the guide rail which extend in each case in a longitudinal direction. All the deflection channels are arranged within two separate end caps which are fastened to the two longitudinal end faces of the main body of the guide carriage which lie opposite one another. The separate main body made from metal, in particular from steel, is of U-shaped configuration as viewed in cross section. In each case one raceway insert which is composed of hardened steel bears against the inner sides of the corresponding U-limbs, in each case two carriage raceways being provided on one raceway insert.

In order to hold the rolling bodies in the guide carriage when the latter is not mounted on the guide rail, a rolling-body holding web is provided which is configured in one piece with the end caps. The clear span between the rolling-body holding web and the main body in the region of the rail raceway is configured so as to be smaller than the diameter of the rolling bodies, with the result that the latter cannot pass through the corresponding gap.

SUMMARY

The advantage of the present disclosure consists in the fact that the main body can be produced less expensively. In particular, the grinding on the main body in the region of the raceway inserts is simplified. Furthermore, the guide carriage according to the disclosure has fewer individual parts than the known guide carriage.

It is proposed according to the following description that a separate rolling-body guide part is provided which has a guide section which extends in the longitudinal direction, the guide section engaging behind the raceway insert. The gap which prevents the rolling bodies from falling out of the guide carriage is therefore no longer delimited by the main body, but rather by the said guide section. Radially inner deflection surfaces of the deflection channel are preferably provided on the rolling-body guide part. The guide section preferably has a constant cross-sectional shape along the longitudinal direction. The raceway insert is preferably composed of metal, in particular of hardened steel. The raceway insert preferably bears directly against the main body. However, it can also be adhesively bonded to the latter.

Advantageous developments and improvements of the disclosure are specified in the following description.

It is preferred that the guide section has a first rolling-body guide face which delimits the circulatory channel in the load-bearing section, the first rolling-body guide face being of circular configuration as viewed in cross section. The spherical rolling bodies can therefore run along the first rolling-body guide face with low noise. The rolling-body guide part is preferably composed of plastic. It is preferably produced in the injection molding process.

It is preferred that a rolling-body holding web is provided which extends in the longitudinal direction and has a second rolling-body guide face which delimits the circulatory channel in the load-bearing section in such a way that the carriage raceway is arranged between the first and the second rolling-body guide face, the second rolling-body guide face being of circular configuration as viewed in cross section, the clear span between the first and the second rolling-body guide face in the region of the rail raceway being smaller than the diameter of the rolling bodies. This prevents the rolling bodies from falling out of the guide carriage when the latter is not mounted on the guide rail. The rolling-body holding web is preferably configured in one piece with the end caps, it being possible for in each case one part of the rolling-body holding web to be arranged on each of the two end caps. It is preferred that the main body has a flat bearing face, against which the guide section bears, the raceway insert extending between the rolling bodies in the load-bearing section and the bearing face. This achieves the undercut between the guide section and the raceway insert.

It is preferred that a shoulder is arranged on the main body at that end of the bearing face which faces away from the raceway insert, the guide section bearing against the shoulder. The shoulder prevents it being possible for the undercut between the guide section and the raceway insert to be eliminated by way of a deformation of the guide section.

It is preferred that a longitudinal sealing lip is arranged on the guide section, which longitudinal sealing lip is arranged in such a way that it makes contact with the guide rail when the guide carriage is mounted on the latter. As a result, the longitudinal sealing lip which is known per se can be provided particularly inexpensively. The longitudinal sealing lip is preferably configured in one piece with the guide section. The rolling-body guide part is preferably composed of an elastomer, in order that the longitudinal sealing lip has a particularly satisfactory sealing action.

It is preferred that the guide section has a free surface which points away from the raceway insert, the free surface merging without a step into the longitudinal sealing lip. A corresponding guide section is particularly space-saving, with the result that the main body does not have to be weakened unnecessarily in the region of the guide section. Accordingly, the guide carriage has a high rigidity.

It is preferred that the raceway insert has a first and a second carriage raceway, a first bearing face being arranged on the raceway insert between the first and the second carriage raceway, the raceway insert having a second bearing face which is arranged so as to lie opposite the first bearing face, the width of the second bearing face being greater than the width of the first bearing face. The wider second bearing face serves for bearing of the raceway insert in a grinding machine during the machining of the rail raceways which are preferably ground. As a result of the proposed configuration of the raceway insert, the rolling body circulatory means can be arranged at a small spacing from one another. As a consequence, the associated guide rail can be configured with a low height, with the result that material is saved. The first and/or the second bearing face are/is preferably of flat configuration, it being possible for them/it to be interrupted by a groove.

It is preferred that the raceway insert has a groove in the region of the second bearing face, which groove extends in the longitudinal direction over the entire length of the raceway insert. The raceway insert is aligned in a straight manner during the grinding of the carriage raceways via the said groove.

It is preferred that the main body has a V-shaped groove with a first and a second flat side face, the raceway insert bearing against the first and the second side face, the rolling bodies being arranged in the load-bearing section within the straight extension of the first and the second side face. As a consequence, the rolling-body circulatory means which are assigned to the raceway insert can be arranged at a small spacing from one another, without tilting of the raceway insert in the V-shaped groove needing to be feared. The bottom of the V-shaped groove is preferably rounded, the rounding diameter being substantially equal to the width of the second bearing face.

It goes without saying that the features which are mentioned above and are still to be explained in the following text can be used not only in the respectively specified combination, but rather also in other combinations or on their own, without departing from the scope of the present disclosure.

BRIEF DESCRIPTION OF THE DRAWINGS

The disclosure will be explained in greater detail in the following text using the appended drawings, in which.

DETAILED DESCRIPTION

Figure 1:
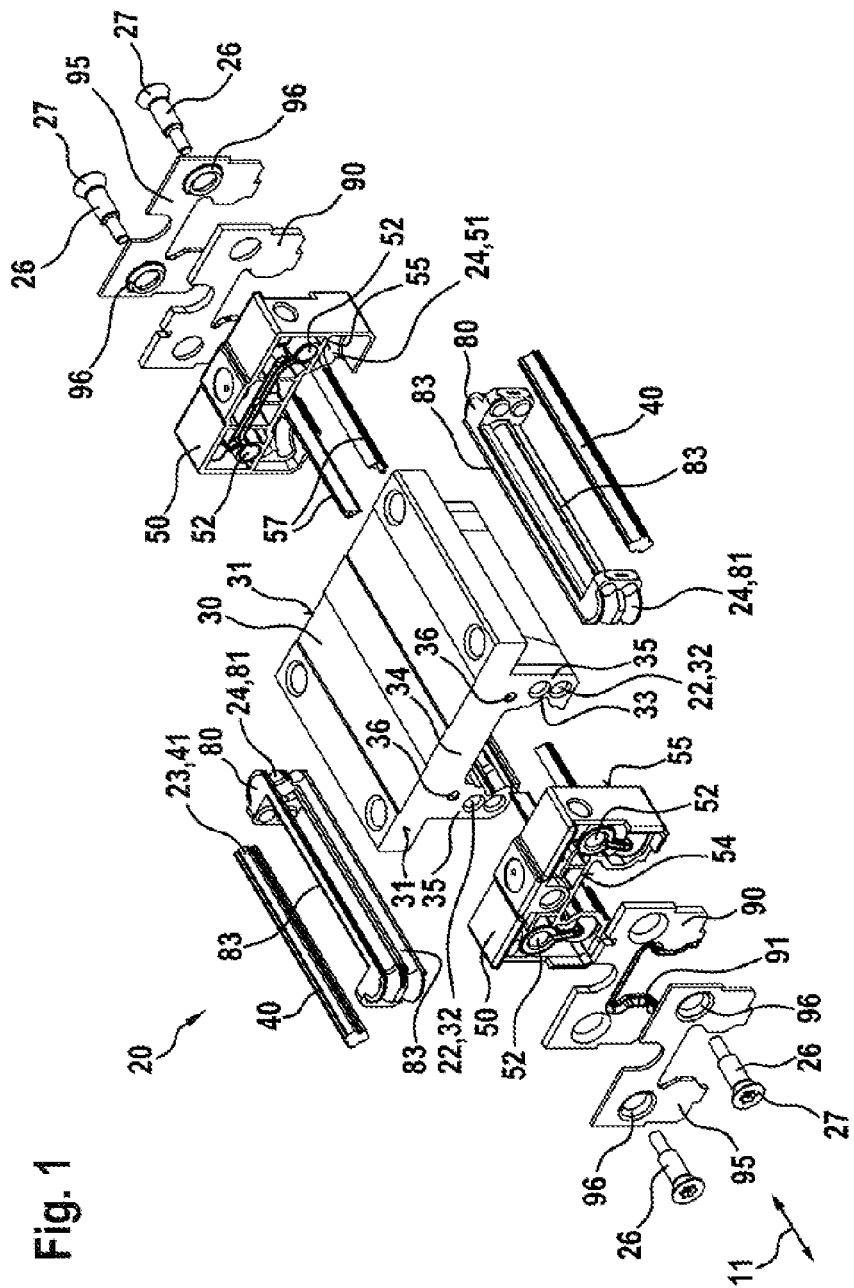
FIG. 1 shows an exploded view of a guide carriage according to the disclosure.

FIG. 1 shows an exploded view of a guide carriage 20 according to the disclosure. The guide carriage 20 comprises a main body 30 which is made from non-hardened steel and extends in a longitudinal direction 11 with a substantially constant, U-shaped cross-sectional shape. In each case one V-shaped groove 33 is arranged on the inner side of the U-limb 35, against which V-shaped groove 33 in each case one separate raceway insert 40 bears which is composed of hardened anti-friction bearing steel. The two raceway inserts 40 extend with a substantially constant cross-sectional shape in the longitudinal direction 11, the said two raceway inserts 40 having in each case two carriage raceways 41a; 41b, with the result that the guide carriage 20 has a total of four rows of rolling bodies (number 21 in FIG. 2).

In each case one end cap 50 bears with an inner longitudinal end side 55 directly against the two flat longitudinal end faces 31 of the main body 30 which lie opposite. The two end caps 50 are of identical configuration, the said two end caps 50 being produced from plastic in the injection molding process. In each case one radially outer deflection surface 51 of a curved deflection channel 24 is provided for each of the four rolling-body rows in the two end caps 50. In each case two associated ends of the two rolling-body guide parts 80, on which the radially inner deflection surfaces 81 of the curved deflection channels 24 are provided, are inserted into the end cap 50.

A return channel 32 runs in the end caps 50 which lie opposite one another between the curved deflection channels 24, which return channel 32 in the present case is configured directly in the main body 30 in the form of a circular hole which is provided with a conical counterbore at its two ends. However, the present disclosure can also be used for guide carriages, in which the return channel is configured in a separate return tube or on the outside of the main body.

In each case two circular fastening holes 52 which extend in the longitudinal direction 11 are arranged in the end caps 50. The fastening holes 52 are penetrated in each case by an associated fastening screw 26 which has an external thread on the end side which is screwed into an associated internal thread 36 in the main body 30. The internal thread 36 is arranged approximately in the region of the transition between the base 34 and an associated U-limb 35 of the main body 30, in order that the two fastening screws 26 press the associated end cap 50 uniformly onto the longitudinal end face of the main body 30 over the entire inner longitudinal end face 55.

In each case one U-shaped end seal 90 rests on the outer longitudinal end face 54 of the end cap 50, which U-shaped end seal 90 is configured substantially as a flat plate with a constant thickness, the said plate being composed of an elastomer, in particular thermoplastic ether ester elastomer (TEEE, commercial name "Hytrel"). The end seal 90 is provided with an end sealing lip 91 which bears sealingly against the guide rail (number 10 in FIG. 2).

In each case one U-shaped wiping plate 95 in turn rests on the outside of the end seal 90, which U-shaped wiping plate 95 is configured in the form of a flat plate with a constant thickness, the said flat plate being composed of stainless steel. The wiping plate 95 is configured at a slight spacing equidistantly with respect to the guide rail, with the result that it can wipe foreign bodies, for example metal chips, from the said guide rail. The fastening screws 26 penetrate both the wiping plate 95 and the end seal 90. Here, a conical head 27 of the fastening screw 26 bears against the wiping plate 95 at a deep-drawn conical counterbore 96. Here, the counterbore 96 is adapted to the head 27 so precisely that there is fluid-tight contact over the entire circumference, in order that no lubricant escapes there. The head 27 of the fastening screw 26 is provided with a Torx profile for engagement of a screwing tool. An internal thread is arranged in the fastening screw 26 at the base of the Torx profile, in order, for example, to fasten the measuring head in accordance with DE 10 2006 027 061 B4 to the guide carriage 20.

Furthermore, reference is also to be made to the rolling-body holding webs 57 which are configured in one piece on the end caps 50, the said rolling-body holding webs 57 extending between the U-limbs 35 of the main body 30. The rolling-body holding webs 57 of the two end caps 50 together extend without a gap over the entire length of the main body 30.

Figure 2:
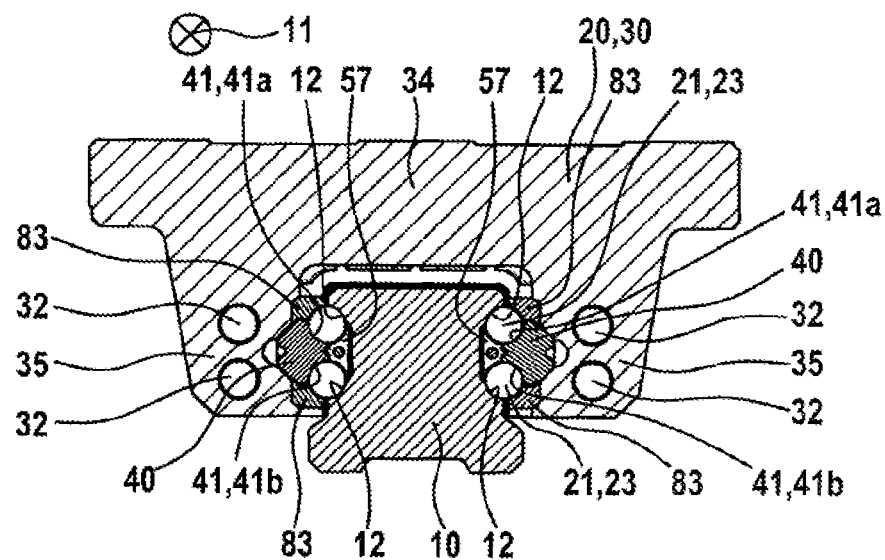
FIG. 2 shows a cross section of the guide carriage according to FIG. 1 with the associated guide rail.

FIG. 2 shows a cross section of the guide carriage 20 according to FIG. 1 with the associated guide rail 10. Here, the sectional plane runs perpendicularly with respect to the longitudinal direction 11 in the center of the main body 30.

The guide rail 10 is composed of steel and is case hardened in the region of the rail raceways 12. It extends precisely along the longitudinal direction 11 with the constant cross-sectional shape which is shown. A total of four rail raceways 12 are arranged in the guide rail 10, which rail raceways 12 delimit the load-bearing section 23 of the endless circulatory channel together with the carriage raceways 41 which lie opposite. The rail raceways and the carriage raceways 12; 41 are of circular configuration as viewed in cross section, the said raceways 12; 41 being adapted with tight osculation to the spherical rolling bodies 21. Furthermore, reference is to be made to the rolling-body holding web 57 which, together with the guide sections 83 of the rolling-body holding parts, holds the rolling bodies 21 in the guide carriage 20 when the latter is not situated on the guide rail 10.

The present guide carriage 20 has four rows of endlessly circulating rolling bodies 21 which are loaded in what is known as an O-arrangement.

Figure 3:
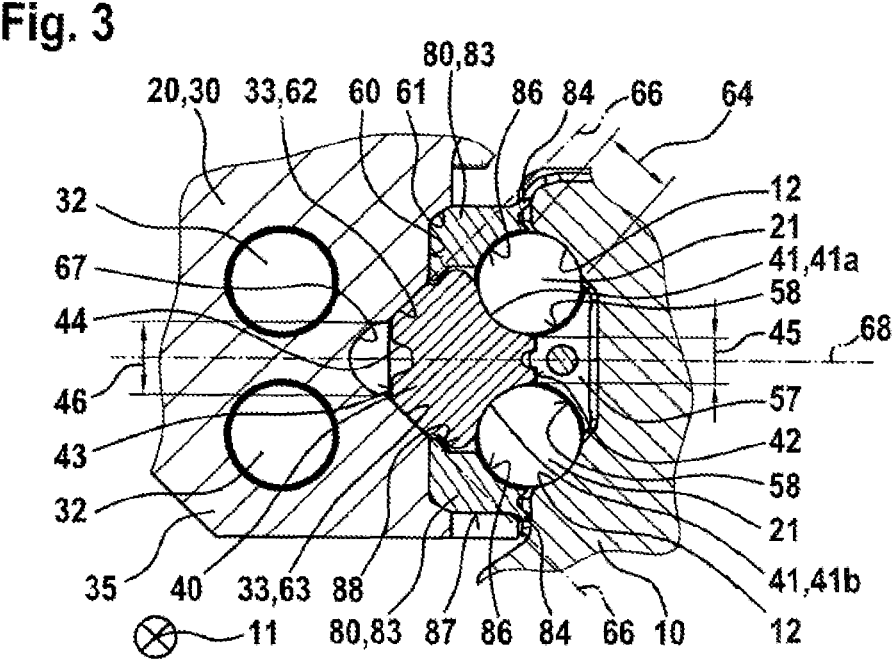
FIG. 3 shows an enlarged part view from FIG. 2 in the region of a raceway insert.

FIG. 3 shows an enlarged part view of FIG. 2 in the region of a raceway insert 40. It can be seen, in particular, how the guide sections 83 of the rolling-body guide part 80 engage behind the raceway insert 40.

The raceway insert 40, the guide sections 83, the rolling-body holding web 57, the return channels 32, the rail raceways 12 and the rolling bodies 21 are arranged mirror-symmetrically with regard to a plane of symmetry 68 which runs parallel to the longitudinal direction 11. In each case two flat bearing faces 60 are provided on each U-limb 35 of the main body 30, which flat bearing faces 60 run in a plane which is arranged perpendicularly with respect to the plane of symmetry 68. The bearing faces 60 are delimited at the top and bottom by a shoulder 61 which has rounded corners, the said shoulder 61 being configured otherwise in the manner of an insertion bevel. In each case one guide section 83 bears against the bearing face 60 and the associated shoulder 61. It is to be noted here that the guide section 83 extends with the constant cross-sectional shape which is shown in FIG. 3 over the entire length of the main body 30.

Lying opposite the shoulder 61, the guide section 83 is provided with a lug which is delimited by a flat holding face 88 which is arranged parallel to a side face of the associated side face 62; 63 of the V-shaped groove 33 in the main body 30. The holding face 88 engages behind the raceway insert 40, the latter extending between the rolling bodies 21 and the bearing face 60, with the result that it can bear against the holding face 88.

Adjacently with respect to the holding face 88, the guide section 83 is provided with a first rolling-body guide face 86 which is of circular configuration as viewed in cross section, the corresponding radius being adapted to the rolling bodies 21.

A second rolling-body guide face 58 which is likewise of circular configuration as viewed in cross section is arranged on the other side of the rolling bodies 21, the corresponding radius being adapted to the rolling bodies 21. An associated carriage raceway 41 which is situated on the raceway insert 40 is arranged between the first and the second rolling-body guide face 86; 58. On the other side of the rolling bodies 21, a gap is provided between the first and the second rolling-body guide face 86; 58, the width 64 of which gap is smaller than the diameter of the spherical rolling bodies 21. This prevents the rolling bodies 21 from falling out of the guide carriage when the latter is not situated on the guide rail 10. Otherwise, the rail raceway 12 is situated in the region of the said gap.

On the side which faces away from the raceway insert 40, the guide section 83 is provided with a free surface 87 which does not bear against the main body. The free surface 87 merges without a step but with a slight kink into a longitudinal sealing lip 84 which is provided integrally on the guide section 83. The tip of the longitudinal sealing lip 84 bears sealingly against an associated side face of the guide rail 10.

Between the first and the second carriage raceway 41a; 41b, the raceway insert is provided with a first flat bearing face 42, against which the rolling-body holding web 57 bears. The first bearing face 42 is oriented perpendicularly with respect to the plane of symmetry 68, the said first bearing face 42 being provided in the center with a groove, into which the rolling-body holding web 57 engages, with the result that it is oriented precisely relative to the raceway insert. Lying opposite the first bearing face 42, a flat second bearing face 43 is provided on the raceway insert 40, the width 46 of which flat second bearing face 43 is configured so as to be greater than the width 45 of the first bearing face 42. The width 45 of the first bearing face 42 has been configured so as to be small, in order that the spacing of the two rolling-body rows is small. In contrast, the width 46 of the second bearing face 43 has being configured so as to be large, in order that it can serve as a bearing face during the grinding of the raceway insert 40. The second bearing face 43 is likewise oriented perpendicularly with respect to the plane of symmetry 68, a groove 44 being arranged in the center, by way of which groove 44 the said second contact face 43 can be oriented in a straight manner during the said grinding.

The raceway insert 40 bears directly against a V-shaped groove 33 in the main body, the said raceway insert 40 being pressed against the groove 33 only by the prestressing force of the rolling bodies 21. The V-shaped groove 33 has a first and a second side face 62; 63 which enclose an angle of approximately 90°. The load-bearing rolling bodies 21 are arranged completely within the extensions 66 of the said side faces 62; 63. Between the first and the second side face 62; 63, the V-shaped groove 33 is provided with a rounded portion 67, the corresponding rounding diameter being configured so as to be approximately equal to the width 46 of the second bearing face 43.

Figure 4:
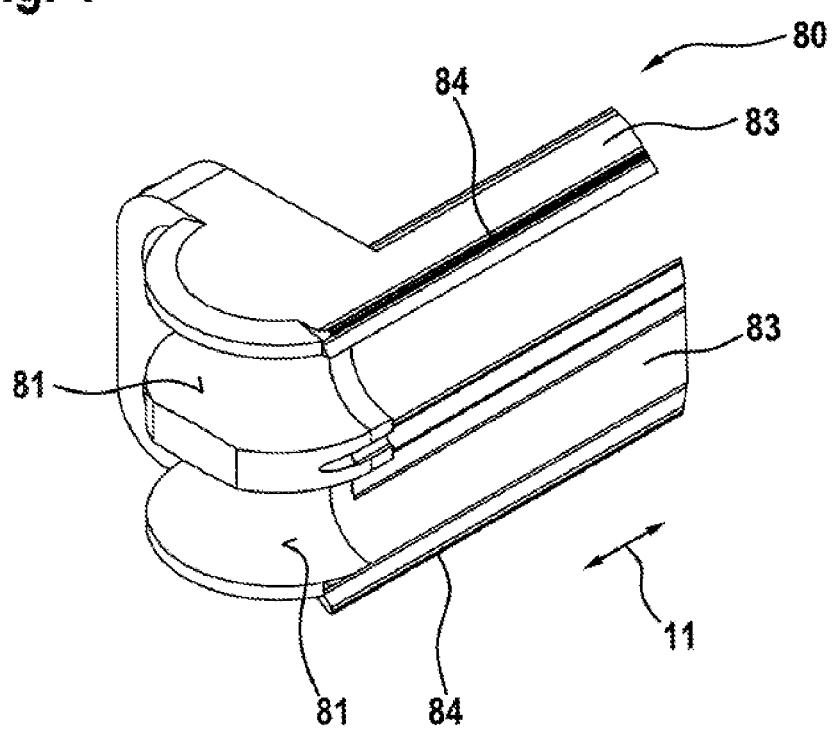
FIG. 4 shows a perspective part view of the rolling-body guide part in the region of the radially inner deflection surfaces.

FIG. 4 shows a perspective part view of the rolling-body guide part 80 in the region of the radially inner deflection surfaces 81. A rolling-body guide part 80 is assigned two rows of rolling bodies which run in parallel. It therefore has two radially inner deflection surfaces 81 of the deflection channel at both ends, which radially inner deflection surfaces 81 run in a circularly curved manner with the same radius with regard to a common axis of curvature.

Furthermore, two parallel guide sections 83 which run in the longitudinal direction 11 with a constant cross-sectional shape are provided integrally on the rolling-body guide part 80. In each case one longitudinal sealing lip 84 is provided on the guide sections 83, which longitudinal sealing lip 84 bears sealingly against the guide rail when the guide carriage is mounted on the latter. Furthermore, the guide sections 83 hold the rolling bodies in the guide carriage when the latter is not situated on the guide rail.

The rolling-body guide part 80 is of mirror-symmetrical configuration with regard to the plane of symmetry which is identified by number 68 in FIG. 3. Moreover, it is of mirror-symmetrical configuration with respect to a further plane of symmetry which runs perpendicularly with respect to the longitudinal direction 11. The rolling-body guide part 80 is configured in one piece, and is composed of an elastomer, preferably of thermoplastic ether ester elastomer (TEEE, commercial name "Hytrel").

LIST OF REFERENCE NUMERALS

10 Guide rail
11 Longitudinal direction
12 Rail raceway

20 Guide carriage
21 Rolling bodies
22 Circulatory channel
23 Load-bearing section
24 Deflection channel
26 Fastening screw
27 Head of the fastening screw
30 Main body
31 Longitudinal end face of the main body
32 Return channel
33 V-shaped groove
34 Base
35 U-limb
36 Internal thread
40 Raceway insert
41 Carriage raceway
41a First carriage raceway
41b Second carriage raceway
42 First bearing face
43 Second bearing face
44 Groove
45 Width of the first bearing face
46 Width of the second bearing face
50 End cap
51 Radially outer deflection surface
52 Fastening hole
54 Outer longitudinal end face of the end cap
55 Inner longitudinal end face of the end cap
57 Rolling-body holding web
58 Second rolling-body guide face
60 Bearing face
61 Shoulder
62 First side face of the V-shaped groove
63 Second side face of the V-shaped groove
64 Clear span between the first and the second rolling-body guide face
66 Extension of the first and second side face
67 Rounded portion
68 Plane of symmetry
80 Rolling-body guide part
81 Radially inner deflection surface
83 Guide section
84 Longitudinal sealing lip
86 First rolling-body guide face
87 Free surface of the guide section and of the longitudinal sealing lip
88 Holding face
90 End seal
91 End sealing lip
95 Wiping plate
96 Counterbore

What is claimed is:

1. A guide carriage for use with an elongate guide rail, the guide carriage comprising:
a main body made of metal;
at least one endless circulatory channel having a load-bearing section and a return channel,
the load-bearing section and the return channel connected to one another at their ends which lie opposite one another,
each of the ends of the load-bearing section and the return channel connected via a curved deflection channel, the load-bearing section delimited by a carriage raceway, which extends in a longitudinal direction on the guide carriage, and a rail raceway on the guide rail,
the carriage raceway arranged on a separate raceway insert configured to bear against the main body;
at least one row of spherical rolling bodies received in a respective one of the at least one circulatory channel; and
a separate rolling-body guide part having a guide section which extends in the longitudinal direction, the guide section configured to engage behind the raceway insert, wherein:
the guide section has a first rolling-body guide face configured to delimit the at least one circulatory channel in the load-bearing section, and
the first rolling-body guide face has a circular configuration as viewed in cross section.

2. The guide carriage according to claim 1, further comprising:
a rolling-body holding web extending in the longitudinal direction, the rolling-body holding web having a second rolling-body guide face configured to delimit the at least one circulatory channel in the load-bearing section such that the carriage raceway is arranged between the first rolling-body guide face and the second rolling-body guide face, wherein:
the second rolling-body guide face has a circular configuration as viewed in cross section, and
a clear span between the first rolling-body guide face and the second rolling-body guide face in a region of the rail raceway is smaller than a diameter of the rolling bodies.

3. The guide carriage according to claim 1, wherein:
the main body has a flat bearing face,
the guide section is configured to bear against the flat bearing face, and
the raceway insert extends between the rolling bodies in the load-bearing section and the bearing face.

4. The guide carriage according to claim 3, wherein:
a shoulder is arranged on the main body at an end of the bearing face which faces away from the raceway insert, and
the guide section is configured to bear against the shoulder.

5. The guide carriage according to claim 1, wherein:
a longitudinal sealing lip is arranged on the guide section, and
the longitudinal sealing lip is arranged in such a way that it makes contact with the guide rail when the guide carriage is mounted on the guide rail.

6. The guide carriage according to claim 5, wherein:
the guide section has a free surface facing away from the raceway insert, and
the free surface merges into the longitudinal sealing lip without a step.

7. The guide carriage according to claim 1, wherein:
the raceway insert has a first carriage raceway and a second carriage raceway,
a first bearing face is arranged on the raceway insert between the first and second carriage raceways,
the raceway insert has a second bearing face arranged so as to lie opposite the first bearing face, and
a width of the second bearing face is greater than a width of the first bearing face.

8. The guide carriage according to claim 7, wherein the raceway insert has a groove in a region of the second bearing face, the groove extending in the longitudinal direction over an entire length of the raceway insert.

9. The guide carriage according to claim 7, wherein:
the main body has a V-shaped groove with a first flat side face and a second flat side face,
the raceway insert is configured to bear against the first and second side faces, and
the rolling bodies are arranged in the load-bearing section within a straight extension of the first and second side faces.

10. A guide carriage for use with an elongate guide rail, the guide carriage comprising:
a main body made of metal;
at least one endless circulatory channel having a load-bearing section and a return channel,
the load-bearing section and the return channel connected to one another at their ends which lie opposite one another,
each of the ends of the load-bearing section and the return channel connected via a curved deflection channel, the load-bearing section delimited by a carriage raceway, which extends in a longitudinal direction on the guide carriage and a rail raceway on the guide rail,
the carriage raceway arranged on a separate raceway insert configured to bear against the main body,
the raceway insert having:
a first carriage raceway;
a second carriage raceway;
a first bearing face arranged on the raceway insert between the first carriage raceway and the second carriage raceway;
a second bearing face arranged so as to lie opposite the first bearing face, a width of the second bearing face being greater than a width of the first bearing face; and
a groove in a region of the second bearing face, the groove extending in the longitudinal direction over an entire length of the raceway insert;
at least one row of spherical rolling bodies received in a respective one of the at least one circulatory channel; and
a separate rolling-body guide part having a guide section which extends in the longitudinal direction, the guide section configured to engage behind the raceway insert.

11. The guide carriage according to claim 10, wherein:
the main body has a flat bearing face,
the guide section is configured to bear against the flat bearing face, and
the raceway insert extends between the rolling bodies in the load-bearing section and the bearing face.

12. The guide carriage according to claim 11, wherein:
a shoulder is arranged on the main body at an end of the bearing face which faces away from the raceway insert, and
the guide section is configured to bear against the shoulder.

13. The guide carriage according to claim 10, wherein:
a longitudinal sealing lip is arranged on the guide section, and
the longitudinal sealing lip is arranged in such a way that it makes contact with the guide rail when the guide carriage is mounted on the guide rail.

14. The guide carriage according to claim 13, wherein:
the guide section has a free surface facing away from the raceway insert, and
the free surface merges into the longitudinal sealing lip without a step.

15. The guide carriage according to claim 10, wherein:
the main body has a V-shaped groove with a first flat side face and a second flat side face,
the raceway insert is configured to bear against the first and second side faces, and
the rolling bodies are arranged in the load-bearing section within a straight extension of the first and second side faces.

16. A guide carriage for use with an elongate guide rail, the guide carriage comprising:
a main body made of metal and having a flat bearing face;
at least one endless circulatory channel having a load-bearing section and a return channel,
the load-bearing section and the return channel connected to one another at their ends which lie opposite one another,
each of the ends of the load-bearing section and the return channel connected via a curved deflection channel, the load-bearing section delimited by a carriage raceway, which extends in a longitudinal direction on the guide carriage and a rail raceway on the guide rail,
the carriage raceway arranged on a separate raceway insert configured to bear against the main body;
at least one row of spherical rolling bodies received in a respective one of the at least one circulatory channel, the raceway insert extending between the at least one row of rolling bodies in the load-bearing section of the at least one circulatory channel and the bearing face of the main body; and
a separate rolling-body guide part having a guide section which extends in the longitudinal direction, the guide section configured to engage behind the raceway insert, and configured to bear against the flat bearing face of the main body.

17. The guide carriage according to claim 16, wherein:
a shoulder is arranged on the main body at an end of the bearing face which faces away from the raceway insert, and
the guide section is configured to bear against the shoulder.

18. The guide carriage according to claim 16, wherein:
a longitudinal sealing lip is arranged on the guide section, and
the longitudinal sealing lip is arranged in such a way that it makes contact with the guide rail when the guide carriage is mounted on the guide rail.

19. The guide carriage according to claim 18, wherein:
the guide section has a free surface facing away from the raceway insert, and
the free surface merges into the longitudinal sealing lip without a step.

20. The guide carriage according to claim 16, wherein:
the raceway insert has a first carriage raceway and a second carriage raceway,
a first bearing face is arranged on the raceway insert between the first and second carriage raceways,
the raceway insert has a second bearing face arranged so as to lie opposite the first bearing face, and
a width of the second bearing face is greater than a width of the first bearing face.

21. The guide carriage according to claim 20, wherein the raceway insert has a groove in a region of the second bearing face, the groove extending in the longitudinal direction over an entire length of the raceway insert.

22. The guide carriage according to claim 16, wherein:
the main body has a V-shaped groove with a first flat side face and a second flat side face,
the raceway insert is configured to bear against the first and second side faces, and
the rolling bodies are arranged in the load-bearing section within a straight extension of the first and second side faces.

23. The guide carriage according to claim 16, further comprising a rolling-body holding web extending in the longitudinal direction, wherein:
the guide section has a first rolling-body guide face configured to delimit the at least one circulatory channel in the load-bearing section,
the first rolling-body guide face has a circular configuration as viewed in cross section,
the rolling-body holding web has a second rolling-body guide face configured to delimit the at least one circulatory channel in the load-bearing section such that the carriage raceway is arranged between the first rolling-body guide face and the second rolling-body guide face,
the second rolling-body guide face has a circular configuration as viewed in cross section, and
a clear span between the first rolling-body guide face and the second rolling-body guide face in a region of the rail raceway is smaller than a diameter of the rolling bodies.

24. A guide carriage for use with an elongate guide rail, the guide carriage comprising:
a main body made of metal;
at least one endless circulatory channel having a load-bearing section and a return channel,
the load-bearing section and the return channel connected to one another at their ends which lie opposite one another,
each of the ends of the load-bearing section and the return channel connected via a curved deflection channel, the load-bearing section delimited by a carriage raceway, which extends in a longitudinal direction on the guide carriage, and a rail raceway on the guide rail,
the carriage raceway arranged on a separate raceway insert configured to bear against the main body;
at least one row of spherical rolling bodies received in a respective one of the at least one circulatory channel; and
a separate rolling-body guide part having a guide section which extends in the longitudinal direction, the guide section configured to engage behind the raceway insert, wherein a longitudinal sealing lip is arranged on the guide section such that the sealing lip makes contact with the guide rail when the guide carriage is mounted on the guide rail.

25. The guide carriage according to claim 24, further comprising a rolling-body holding web extending in the longitudinal direction, wherein:
the guide section has a first rolling-body guide face configured to delimit the at least one circulatory channel in the load-bearing section,
the first rolling-body guide face has a circular configuration as viewed in cross section,
the rolling-body holding web has a second rolling-body guide face configured to delimit the at least one circulatory channel in the load-bearing section such that the carriage raceway is arranged between the first rolling-body guide face and the second rolling-body guide face,
the second rolling-body guide face has a circular configuration as viewed in cross section, and
a clear span between the first rolling-body guide face and the second rolling-body guide face in a region of the rail raceway is smaller than a diameter of the rolling bodies.

26. The guide carriage according to claim 24, wherein:
the main body has a flat bearing face,
the guide section is configured to bear against the flat bearing face,
the raceway insert extends between the rolling bodies in the load-bearing section and the bearing face,
a shoulder is arranged on the main body at an end of the bearing face which faces away from the raceway insert, and
the guide section is configured to bear against the shoulder.

27. The guide carriage according to claim 24, wherein:
the guide section has a free surface facing away from the raceway insert, and
the free surface merges into the longitudinal sealing lip without a step.

28. The guide carriage according to claim 24, wherein:
the main body has a V-shaped groove with a first flat side face and a second flat side face,
the raceway insert is configured to bear against the first and second side faces, and
the rolling bodies are arranged in the load-bearing section within a straight extension of the first and second side faces.

29. The guide carriage according to claim 24, wherein:
the raceway insert has a first carriage raceway and a second carriage raceway,
a first bearing face is arranged on the raceway insert between the first and second carriage raceways,
the raceway insert has a second bearing face arranged so as to lie opposite the first bearing face,
a width of the second bearing face is greater than a width of the first bearing face, and
the raceway insert has a groove in a region of the second bearing face, the groove extending in the longitudinal direction over an entire length of the raceway insert.

* * * * *